United States Patent Office 3,243,434
Patented Mar. 29, 1966

---

3,243,434
4,5- AND 6,7-METHYLENE PREGNANES
Gerald W. Krakower, Elizabeth, N.J., assignor to Olin Mathieson Chemical Corporation, New York, N.Y., a corporation of Virginia
No Drawing. Filed May 25, 1964, Ser. No. 370,090
2 Claims. (Cl. 260—239.55)

This invention relates to and has as its object the provision of novel physiologically active steroids and processes for their production.

More particularly, this invention relates to the process for producing steroids possessing an A and B ring system of the formula

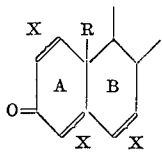

wherein R is selected from the group consisting of hydrogen and lower alkyl (e.g., methyl); and each X is selected from the group consisting of a single bond, a double bond and

The pregnane derivatives of this invention are physiologically active substances which possess progestational activity when administered both in the form of tablets and as a solution or suspension and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets.

The compounds of this invention can be prepared by the process of this invention, entailing a number of steps starting with steroids possessing a conjugated 3-keto system in their A ring structure.

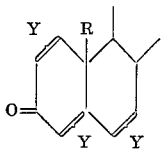

wherein R is as hereinbefore defined, and each Y is selected from the group consisting of a single bond and a double bond, at least one Y in ring A being a double bond.

The starting materials of this invention may be steroids having a conjugated 3-keto system in their ring A structure and may include such compounds as 3-keto-$\Delta^{4,6}$-pregnadienes; 3-keto-$\Delta^4$-19-norpregnenes; 3-keto-$\Delta^{1,4}$-pregnadienes; 3-keto-$\Delta^{1,4,6}$-pregnatrienes (3-keto-$\Delta^{4,6}$-androstadienes; 3-keto-$\Delta^{1,4}$-androstadienes; 3-keto-$\Delta^4$-19-norandrostenes) and other like compounds.

The final products of this invention are prepared by the novel process of this invention which comprises reacting the starting materials of this invention with a dimethyl sulfoxidemethylide reactant to obtain the desired methylene derivatives. Thus when a 3-keto-$\Delta^{1,4}$ steroid is employed as starting material, the final product will be a 1α,2α-methylene-3-keto-$\Delta^4$ steroid.

The invention may be further illustrated by the following examples:

EXAMPLE 1

*1α,2α-methylene-16α,17α-(dimethylmethylenedioxy)-$\Delta^{4,6}$-pregnadiene-3,20-dione*

3.3 grams of 16α,17α-(dimethylmethylenedioxy)-$\Delta^{1,4,6}$-pregnatriene-3,20-dione is added to a solution of 25 mmoles of dimethylsulfoxonium methylide and 50 ml. of dimethylsulfoxide and the mixture stirred at room temperature for 22 hours under nitrogen. The reaction mixture is diluted with water and the resulting precipitate filtered. The solid material is taken up in ether-ethyl acetate and washed with water, dried over magnesium sulfate and the solvent evaporated, to give 4.5 grams of material with a strong odor of dimethylsulfoxide. Chromatography on 100 grams of neutral alumina and elution with benzene and benzene-chloroform 4:1 gives 2.83 g. of 1α,2α-methylene-16α,17α-(dimethylmethylenedioxy)-$\Delta^{4,6}$-pregnadiene-3,20-dione. Recrystallization from methanol gives 1.177 g. of pure material, M.P. 253–255° C.

EXAMPLE 2

*6α,7α-methylene-16α,17α-(dimethylmethylenedioxy)-$\Delta^4$-pregnene-3,20-dione*

3.87 mg. of 16α,17α-(dimethylmethylenedioxy)-$\Delta^{4,6}$-pregnadiene-3,20-dione is added to a solution of 5 mmoles of dimethylsulfoxonium methylide in 25 ml. of dimethylsulfoxide and the mixture stirred at room temperature under nitrogen for 23 hours. The reaction mixture is diluted with water and extracted with ether. The ether solution is washed with water, dried, and evaporated to give 264 mg. of oil. After thin layer chromatography (Activity V—alumina) and elution of the major bands 284 mg. of crystalline material is obtained. Recrystallization from methanol gives 69 mg. of 6α,7α-methylene-16α,17α-(dimethylmethylenedioxy)-$\Delta^4$-pregnene-3,20-dione, M.P. 201–205° C. Further recrystallization gives analytically pure material, M.P. 207–209° C., $[\alpha]_D$ −83.3°, $\lambda_{Max.}^{EtOH}$ 267 mµ (ε, 16,000)

*Analysis.*—Calc'd for $C_{25}H_{34}O_4$: C, 75.34; H, 8.60. Found: C, 75.45; H, 8.63.

EXAMPLE 3

*4β,5-methylene-16α,17α-(dimethylmethylenedioxy)-19-nor-5β-pregnane-3,20-dione*

Following the procedure of Example 2 but substituting an equivalent amount of 16α,17α-(dimethylmethylenedioxy)-$\Delta^4$-19-norpregnane-3,20-dione for 16α,17α-(dimethylmethylenedioxy)-$\Delta^{4,6}$-pregnadiene-3,20-dione there is obtained 4β,5-methylene-16α,17α-(dimethylmethylenedioxy)-19-nor-5β-pregnane-3,20-dione having the following properties: M.P. 155–157° C., $[\alpha]_D$ +80.7°.

*Analysis.*—Calc'd for $C_{24}H_{34}O_4$: C, 74.57; H, 8.87. Found: C, 74.50; H, 8.89.

EXAMPLE 4

*1α,2α-methylene-16α,17α-(dimethylmethylenedioxy)-$\Delta^4$-pregnene-3,20-dione*

Following the procedure set forth in Example 2 but substituting an equivalent amount of 16α,17α-(dimethylmethylenedioxy)-$\Delta^{1,4}$-pregnadiene-3,20-dione for 16α,17α-(dimethylmethylenedioxy) - $\Delta^{4,6}$ - pregnadiene-3,20-dione there is obtained 1α,2α - methylene - 16α,17α - (dimethylmethylenedioxy)-$\Delta^4$-pregnene-3,20-dione.

The invention may be variously otherwise embodied within the scope of the appended claims.

What is claimed is:

1. 6α,7α - methylene - 16α,17α - (dimethylmethylenedioxy)-$\Delta^4$-pregnene-3,20-dione.

2. 4β,5-methylene-16α,17α-(dimethylmethylenedioxy)-19-nor-5β-pregnane-3,20-dione.

No references cited.

LEWIS GOTTS, *Primary Examiner.*

HENRY A. FRENCH, *Assistant Examiner.*